No. 660,455. Patented Oct. 23, 1900.
LE GRAND W. PELLETREAU.
ATTACHMENT FOR LAWN MOWERS.
(Application filed May 28, 1900.)

(No Model.) 2 Sheets—Sheet 1.

Witnesses:
C. N. Saxton
Edwin P. Rea

Inventor
LeGrand W. Pelletreau,
By Geo. N. Rea,
Atty.

THE NORRIS PETERS CO., PHOTO-LITHO., WASHINGTON, D. C.

No. 660,455. Patented Oct. 23, 1900.
LE GRAND W. PELLETREAU.
ATTACHMENT FOR LAWN MOWERS.
(Application filed May 28, 1900.)
(No Model.) 2 Sheets—Sheet 2.
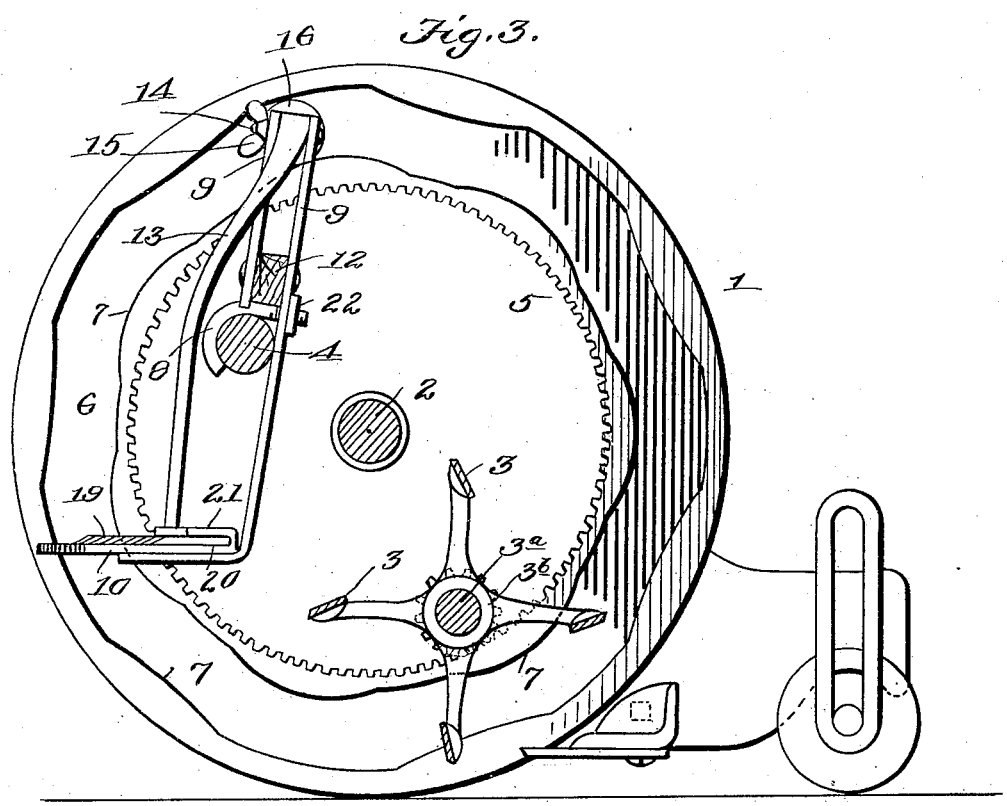
Fig. 3.
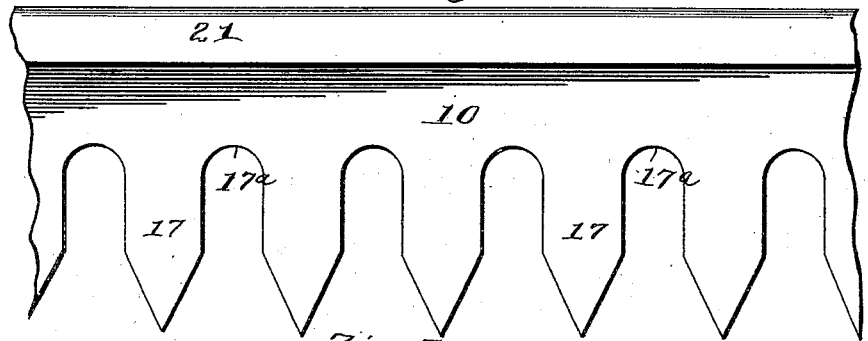
Fig. 4.
Fig. 5.
Witnesses
W. Lee Helus.
Geo. E. Sullivan.
Inventor
Legrand W. Pelletreau
BY Geo. W. Rea
Atty

UNITED STATES PATENT OFFICE.

LE GRAND W. PELLETREAU, OF EAST MORICHES, NEW YORK.

ATTACHMENT FOR LAWN-MOWERS.

SPECIFICATION forming part of Letters Patent No. 660,455, dated October 23, 1900.

Application filed May 28, 1900. Serial No. 18,272. (No model.)

*To all whom it may concern:*

Be it known that I, LE GRAND W. PELLETREAU, a citizen of the United States of America, residing at East Moriches, in the county of Suffolk and State of New York, have invented certain new and useful Improvements in Attachments for Lawn-Mowers, of which the following is a specification.

My invention relates to improvements in attachments for lawn-mowers; and it has for its object to provide a novel, simple, and economical arrangement which is readily attachable to and removable from ordinary rotary-knife lawn-mowers, which is composed of few and simple parts and possessing novel operating means.

In lawn-mowers of the rotary-blade type, which is the kind in general use, it is found that long-stemmed grass, daisies, black-heads, and other growth instead of being trimmed off by the rotary knives are either pushed aside and remain uncut, making it necessary that the lawn be gone over again with a hand-knife or other implement to cut off the uncut long-stemmed growths, or when such are not pushed aside, as described, they become entangled with the knife, choking the machine and requiring that work be stopped and the entanglement freed. By my invention I provide an attachment for an ordinary rotary-blade lawn-mower having a reciprocating cutter arranged in advance of and preferably in a higher plane than the cutting-plane of the rotary knives, which will cut off the daisies, black-heads, and other long-stemmed growths to a height where they will be perfectly trimmed by the following rotary knives, such attachment being of simple and economical construction and so arranged that it may be readily attached to and detached from the ordinary rotary-blade lawn-mower as now in general use.

To the ends stated the invention consists in the novel construction, combination and arrangement, and operation of parts hereinafter described and claimed, reference being had to the accompanying drawings, in which—

Figure 1:
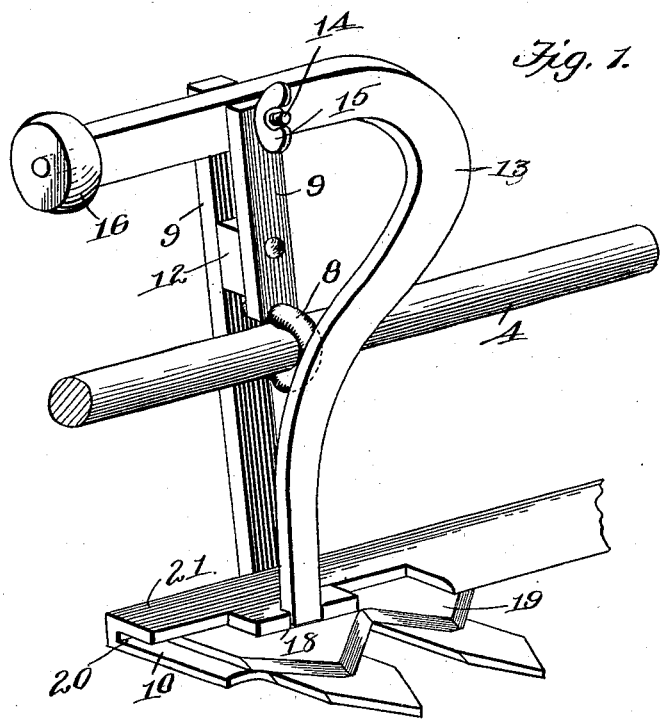
Figure 2:
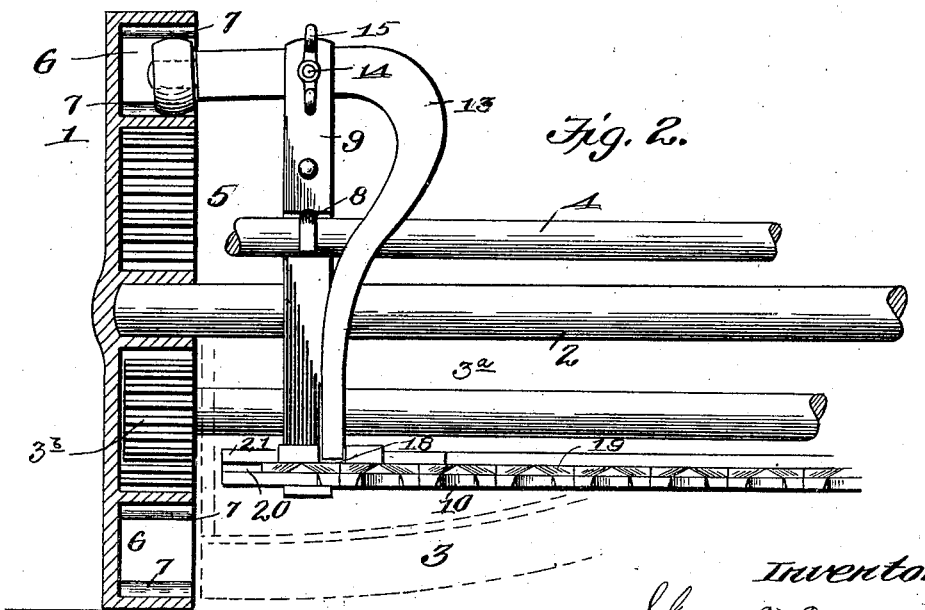

Figure 1 is a partial perspective view illustrating my improved attachment hung on the front bar of an ordinary mower. (Not shown.) Fig. 2 is a partial front elevation thereof and showing also in dotted lines the blades of the rotary lawn-mower and means for driving the same. Fig. 3 is a central vertical section of the same. Fig. 4 is a partial elevation of the guard-plate and guard-fingers, and Fig. 5 a similar view of the reciprocating knife.

In the said drawings the reference-numeral 1 indicates a drive-wheel of the usual rotary-blade lawn-mower, 2 the axle thereof, and 3 the blades, all of which may be of any usual or ordinary construction.

The numeral $3^a$ indicates the shaft of the rotary knives, and $3^b$ a gear at one end thereof, which meshes with the internal gear 5, provided on the driving-wheel. This arrangement shows one form of rotary cutting-knives and means for driving the same; but I wish it understood that my invention does not concern the particular arrangement and is not restricted to lawn-mowers in which such arrangement is embodied.

The numeral 4 indicates the front bar of a lawn-mower, which is also an element of ordinary construction and found in most types of lawn-mowers, extending in front of the rotary blade from end to end of the frame.

As shown in the accompanying drawings and as preferred by me, my improved attachment is driven by means of one of the drive-wheels of the lawn-mower, which is suitably constructed for that purpose; but I wish it understood that I do not confine my invention to an attachment so driven, since auxiliary wheels of suitable construction may be provided for this purpose, as will be obvious. The numeral 1 indicates such a drive-wheel or auxiliary wheel, which is provided with a gear 5 for driving the rotary knives and a cam-runway 6, in the example shown in the drawings consisting of two opposing series of lugs 7, the lugs of one series alternating with those of the other. It will be apparent that this is a convenient and, perhaps, preferable form of runway; but I do not limit my invention in its broad aspect to such construction.

Upon the front bar 4 of the machine is detachably hung, by means of hooks 8, a pair of standards or supports 9, (the left-hand pair only being shown in the drawings,) provided at their lower extremities with a guard-plate 10, having guard-fingers of usual construction, except as otherwise herein specified. The standards 9 are separated by means of a spacing-block 12, as shown, and pivoted between the members of the standard, near their upper ends, is a bell-crank or other suitable form of lever 13, by means of a pivot-pin 14, held by a thumb-screw 15 in such manner that it may be removed when desired. At one end this lever is provided with a friction wheel or roller 16, which enters the runway 6 in the mower-wheel, as shown, and the end of the other arm of the lever enters, with the requisite looseness, a socket 18, formed near the end of the reciprocating knife 19, which lies upon and reciprocates within a raceway 20, provided by an overhanging portion 21 of the guard-plate, so that during the travel of the mower the lever 13 is operated to reciprocate the cutter or knife blade over the guard-plate and guard-fingers, so that long-stemmed grass, black-heads, daisies, and other growths will be cut down to a determined height, such that the remaining parts, together with the shorter grass and growths, may be cleanly cut or trimmed to a uniform degree by the rotary cutter, avoiding the objectionable feature which is present in lawn-mowers of usual construction as in present use of leaving remaining uncut an amount of long-stemmed grass or other growths, which has to be trimmed after the lawn-mower has done its work, and avoiding also the liability of such long growths becoming entangled with the rotary knives, choking the machine and requiring a stop of the work for the purpose of removing the entanglement.

The hooks 8, by means of which the reciprocating cutter is hung to the front bar of the mower, are held by means of nuts 22, as shown, so that they are readily removable or may be readily loosened to permit the detachment and attachment of the front cutting mechanism herein described.

The guard-fingers 17 of the guard-plate which I prefer to employ are, as shown, provided with semicircular throats 17$^a$, which are advantageous as compared with the usual formation of guard-finger throats, in that they present a shearing edge which is in direct line with the draft of the machine, whereby the reciprocating cutters act at a greater obliquity than would be possible if the throats converged to a sharp angle, as has been heretofore usual.

It will be seen that my invention provides an attachment for performing the work designed therefor which is of simple and economical construction, composed of novel elements and arrangement thereof, and which can be readily attached to the machine when necessary or removed therefrom when its use is not necessary or desired.

I have in the accompanying drawings illustrated only the left end of the attachment, as my invention may be readily understood therefrom. The opposite end may be a counterpart thereof, or the lever 13 at the opposite end may be omitted, if desired.

Having thus described my invention, what I claim as new, and desire to secure by Letters Patent, is—

1. The combination with a lawn-mower provided with rotary cutting-knives and a front bar, of a reciprocating cutter arranged in front of said knives, and means for detachably hanging said reciprocating cutter on said bar, substantially as described.

2. An attachment for lawn-mowers having front bars consisting of a reciprocating cutter, and means for detachably hanging the same to the front bar of the mower, substantially as described.

3. In an attachment for lawn-mowers provided with front bars, the combination with a reciprocating cutter, of means for detachably hanging the same on the front bar, and means for engaging a wheel of the lawn-mower and said reciprocating cutter for operating the latter, substantially as described.

4. The combination with a lawn-mower provided with rotary cutting-knives and a front bar, of standards supporting a reciprocating cutter, devices for detachably hanging said standards on the front bar of the mower, and means for reciprocating the cutter supported thereby, substantially as described.

5. In an attachment for lawn-mowers, the combination with a guard-plate, a reciprocating knife moving thereover, standards supporting said guard-plate and cutter, and devices for detachably hanging said standards to a front bar of the mower, substantially as described.

6. In an attachment for lawn-mowers, the combination with standards, of hooks for detachably hanging said standards on the front bar of the mower, a reciprocating cutting mechanism supported by said standards, a lever pivoted to one of the standards and engaging the reciprocating cutting mechanism at one end, and a wheel provided with a runway in which the other end of the lever is received, substantially as described.

7. The combination with a lawn-mower provided with rotary cutters, of standards detachably connected with the mower, a reciprocating cutting mechanism supported by said standards in front of the rotary cutters, and a lever pivoted to one of the standards and engaging the reciprocating cutting mechanism at one end, and a wheel provided with a runway in which the other end of the lever is received, substantially as described.

In testimony whereof I have hereunto set my hand in presence of two subscribing witnesses.

LE GRAND W. PELLETREAU.

Witnesses:
JOHN E. KETCHAM,
LILLIE KALLER.